(12) United States Patent
Haemmerle

(10) Patent No.: US 12,252,431 B2
(45) Date of Patent: Mar. 18, 2025

(54) QUARTZ FIBRE WITH HYDROGEN BARRIER LAYER AND METHOD FOR THE PRODUCTION THEREOF

(71) Applicant: j-fiber GmbH, Jena (DE)

(72) Inventor: Wolfgang Haemmerle, Jena (DE)

(73) Assignee: J-FIBER GMBH, Jena (DE)

( * ) Notice: Subject to any disclaimer, the term of this patent is extended or adjusted under 35 U.S.C. 154(b) by 515 days.

(21) Appl. No.: 17/617,326

(22) PCT Filed: Jun. 8, 2020

(86) PCT No.: PCT/EP2020/065810
§ 371 (c)(1),
(2) Date: Dec. 8, 2021

(87) PCT Pub. No.: WO2020/249508
PCT Pub. Date: Dec. 17, 2020

(65) Prior Publication Data
US 2022/0227657 A1   Jul. 21, 2022

(30) Foreign Application Priority Data
Jun. 12, 2019   (DE) .............. 10 2019 115 928.8

(51) Int. Cl.
*C03B 37/012*   (2006.01)
*C03B 37/018*   (2006.01)
(Continued)

(52) U.S. Cl.
CPC ...... *C03B 37/01211* (2013.01); *C03B 37/018* (2013.01); *C03B 37/027* (2013.01);
(Continued)

(58) Field of Classification Search
CPC .... C03C 37/00; C03C 2201/02; C03B 37/018
See application file for complete search history.

(56) References Cited

U.S. PATENT DOCUMENTS 4,276,243 A   6/1981 Partus
4,412,853 A   11/1983 Partus
(Continued)

FOREIGN PATENT DOCUMENTS

EP   0095729   7/1983
EP   1020413   7/2000
(Continued)

OTHER PUBLICATIONS

Machine Translation of JPH06321551 (Year: 1994).*
(Continued)

*Primary Examiner* — Alison L Hindenlang
*Assistant Examiner* — Steven S Lee
(74) *Attorney, Agent, or Firm* — Tarolli, Sundheim, Covell & Tummino LLP

(57) ABSTRACT

A method of manufacturing a quartz glass fibre includes producing a quartz glass primary preform by modified chemical vapor deposition (MCVD) in a quartz glass substrate tube and inserting the quartz glass primary preform into a glass jacketing tube. Defect-generating UV radiation is irradiated into the cross-sectional area of the glass jacketing tube while combining the quartz glass primary preform with the glass jacketing tube in the jacketing process to form a cladding layer to a secondary preform. A quartz glass fibre is pulled from the secondary preform.

9 Claims, 3 Drawing Sheets

Figure 1:
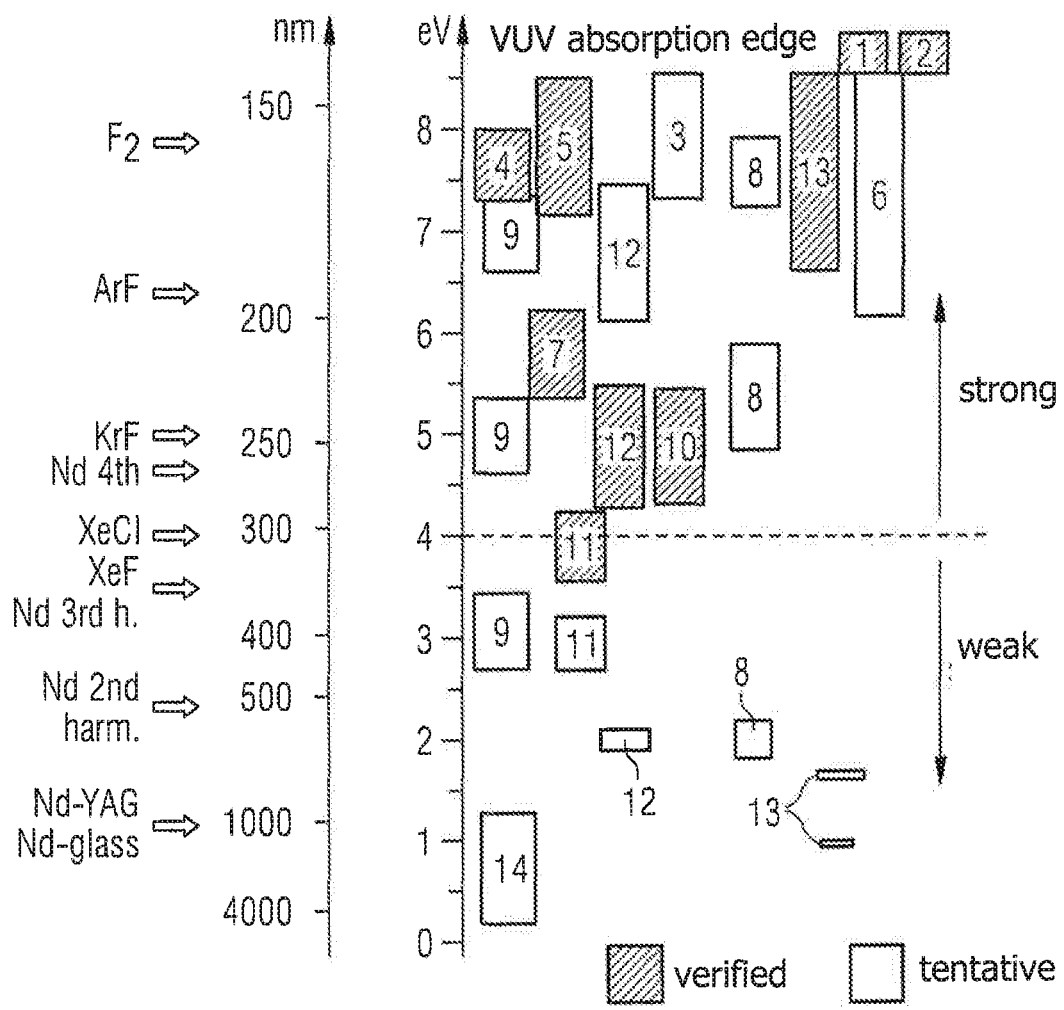

(51) Int. Cl.
*C03B 37/027* (2006.01)
*C03C 3/06* (2006.01)
*C03C 13/04* (2006.01)
*C03C 25/6226* (2018.01)

(52) U.S. Cl.
CPC .............. *C03C 3/06* (2013.01); *C03C 13/046* (2013.01); *C03C 25/6226* (2013.01); *C03B 2201/075* (2013.01); *C03B 2201/12* (2013.01); *C03C 2201/12* (2013.01); *C03C 2203/40* (2013.01); *C03C 2203/50* (2013.01); *C03C 2213/00* (2013.01)

(56) References Cited

U.S. PATENT DOCUMENTS

| | | | |
|---|---|---|---|
| 4,582,480 A | | 4/1986 | Lynch et al. |
| 5,478,371 A | * | 12/1995 | Lemaire ................. C03C 23/007 65/424 |
| 5,763,340 A | * | 6/1998 | Nishii ................... G02B 6/1347 501/36 |
| 5,930,420 A | * | 7/1999 | Atkins ................ G02B 6/02114 430/290 |
| 5,983,673 A | * | 11/1999 | Urano ....................... G02B 6/02 65/424 |
| 6,161,398 A | | 12/2000 | Partus |
| 6,192,712 B1 | * | 2/2001 | Saito ....................... G02B 6/132 65/413 |
| 6,220,059 B1 | | 4/2001 | Klein et al. |
| 6,333,283 B1 | * | 12/2001 | Urano ..................... C03B 37/15 501/905 |
| 6,588,236 B2 | * | 7/2003 | Ikushima ............... C03C 25/002 65/378 |
| 6,622,527 B2 | * | 9/2003 | Schotz .................. C03C 25/607 65/424 |
| 6,856,713 B2 | * | 2/2005 | Nelson ................... C03C 13/045 385/115 |
| 6,954,572 B2 | * | 10/2005 | Moridaira ......... C03B 37/01446 385/141 |
| 7,022,633 B2 | * | 4/2006 | Ikuta ........................ C03C 3/06 65/424 |
| 7,506,522 B2 | * | 3/2009 | Bleaking ................... C03C 3/06 65/17.3 |
| 8,591,777 B2 | * | 11/2013 | DiGiovanni ....... G02B 6/02247 264/1.27 |
| 9,919,964 B2 | * | 3/2018 | Hamaguchi ........... C03C 25/106 |
| 2004/0170365 A1 | * | 9/2004 | Yokokawa ......... G02B 6/03694 385/123 |
| 2007/0297735 A1 | * | 12/2007 | Khrapko ............. C03B 37/01807 385/127 |
| 2008/0050086 A1 | * | 2/2008 | Bickham ........... C03B 37/01453 385/142 |
| 2008/0205835 A1 | | 8/2008 | Koilakh et al. |
| 2008/0279515 A1 | * | 11/2008 | Bickham ............ G02B 6/02357 385/123 |
| 2012/0324958 A1 | * | 12/2012 | Yang ................. C03B 37/01892 65/391 |
| 2015/0143851 A1 | * | 5/2015 | Trommer ............ C03B 19/1453 65/397 |
| 2017/0101334 A1 | * | 4/2017 | Haruna ............. C03B 37/01245 |

FOREIGN PATENT DOCUMENTS

| | | | | |
|---|---|---|---|---|
| EP | 1020413 A1 | * | 7/2000 | ............... A47K 5/12 |
| JP | H06321551 A | * | 11/1994 | ............... C03B 8/04 |
| JP | 2009188094 A | | 8/2009 | |
| WO | 2007069275 | | 6/2007 | |
| WO | WO-2007069275 A2 | * | 6/2007 | ............. C03B 32/00 |

OTHER PUBLICATIONS

Corning—Joshua M. Jacobs—The Impact of Hydrogen on Optical Fibers White Paper—Issued Sep. 2004.
High Reliability Hermetic Optical Fiber for Oil and Gas Application—White Paper—Chih-Hao Wang et al.—2014.
Hermetically Coated Specialty Optical Fibers—Oct. 2010—Sergey Semjonov Russian Academy of Sciences.
Rerfractive Index Profile Design to Improve Hydrogen Diffusion Resistance Property of Optical Fiber—Anand Kumar Pandy et al.—ICOP 2009 International Conference on Optical & Photonics—Oct. 30—Nov. 1, 2009.
ESR Study on E-Centers Induced By Optical Fiber Drawing Process—Yoshinori Hibino et al—accepted for publication—Nov. 26, 1983.
Role of Hydrogen Loading and Glass Composition on the Defects Generated By the Femtosecond Laser Writing of Fiber Bragg Gratings—Neil Troy et al.—Accepted Oct. 17, 2012.
Heraeus—High Purity Fused Silica Tubes for Specialty Fiber Production—Apr. 2018.
Testing of Performance of Optical Fibers Under Irradiation in Intense Radiation Fields When Subject O High Temperature—Dr. Thomas Blue—The Ohio State University—Oct. 1, 2009-Oct. 31, 2012.
Numerical Modeling of Hollow Optical Fiber Drawing Process—Jing Jang—Jan. 2008.
Absorption Edge in Silica Glass—R Boscaino et al—Conference Paper —Jul. 2005.
NASA Technical Note—Optical Absorption Coefficients of Fused Silica in the Wavelength Range 0.17 to 3.5 Microns From Room Temperatue To 980°C—Oliver J. Edwards—Feb. 1966.
Crystan—Silica Glass (SiO2)—2012 Crystan Ltd.
Laser-Induced Color Centers in Silica—Linards Skuja et al.—Published 2001.
Hermetic Coating of Optical Fibers—Spectran Corporation—S. Raychaudhuri et al.—Nov. 1987.
Low Speed Carbon Deposition Process for Hermetic Optical Fibers—Publication date: Sep. 29, 1999—Abramczyk et al.
Fiber-Optic Components: Harsh Environment Optical Fiber Coatings: Beauty is Only Skin Deep—Apr. 2015—Chris Emslie.

* cited by examiner

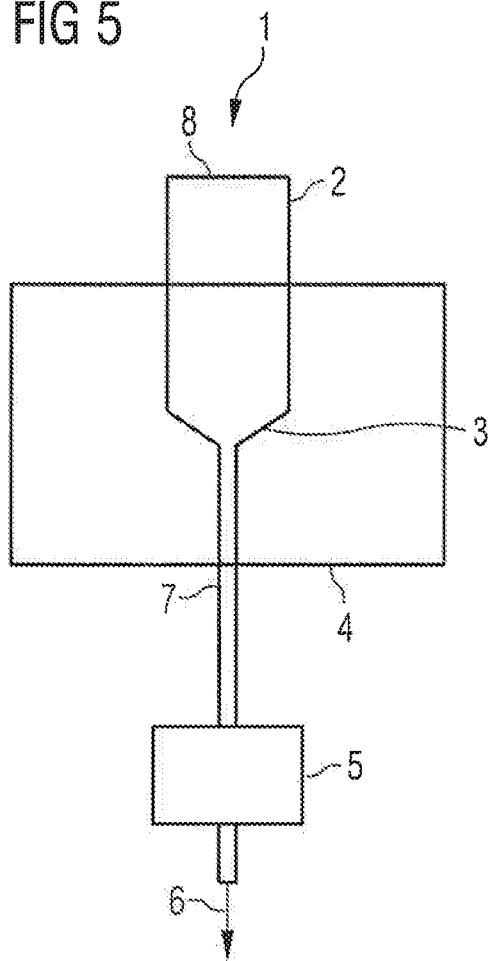

QUARTZ FIBRE WITH HYDROGEN BARRIER LAYER AND METHOD FOR THE PRODUCTION THEREOF

RELATED APPLICATIONS

This application filed under 35 U.S.C § 371 is a national phase application of International Application Number PCT/EP2020/065810, filed Jun. 8, 2020, which claims the benefit of German Application No. 10 2019 115 928.8 filed Jun. 12, 2019, the subject matter of which are incorporated herein by reference in their entirety.

The invention relates to a quartz glass fibre with a hydrogen barrier layer. Manufactured as quartz glass fibre, it can be used as an optical waveguide. In addition, the invention relates to a method of manufacturing the quartz glass fibre.

Technical Principles and State of the Art

The diffusion of hydrogen into quartz glass fibres causes hydrogen-induced additional attenuations in the waveguiding region (in the case of multimode fibres, this is primarily the fibre core), which can significantly limit the usability of the glass fibre or even render the fibre unusable (see https://www.corning.com/media/worldwide/global/documents/sfiber%20WP9007_Hydrogen%20Aging.pdf).

Therefore, it is advantageous to produce hydrogen-insensitive fibres. A hydrogen-insensitive fibre usually consists of a normal quartz fibre, which is coated with a hermetic coating layer. The hermetic protective layer is essentially carbon or metallic coating layers such as, for example, aluminum. However, it is known that hermetic carbon layers act as a hydrogen barrier only up to a temperature of ca. 150° C. (see https://www.lightbrigade.com/productionFiles/Resource-PDF/Whitepapers/Hermetic-Fiber-for-Oil-and-Gas.aspx). At temperatures above this, carbon layers are essentially permeable to hydrogen. Since the carbon layers typically have a thickness of only about 50 nm, other polymer coating layers must additionally be applied for mechanical protection of the fibres.

It is also known that carbon layers as hermetic barrier layers reduce the fibre strength by about 40 to 50% compared to standard fibres (see https://www.laserfocusworld.com/articles/print/volume-51/issue-04/features/fiber-optic-components-harsh-environment-optical-fiber-coatings-beauty-is-only-skin-deep.html).

This makes fibres with carbon layers unsuitable for many applications due to the reduced fibre strength. The production of fibres with hermetic carbon layers also requires special carbon reactors that apply the carbon layer during the fibre drawing process. The fabrication of hermetic carbon layers also requires relatively complex control due to the small layer thicknesses (layer thickness approx. 50 nm). A further problem in the manufacturing of hermetic carbon coating layers is to realize a layer thickness of a few atomic layers without disturbances. Even the smallest layer disturbances prevent the layer from being hermetically sealed. In addition, carbon-coating coated fibres have a significantly reduced fibre strength compared to standard fibres, which also significantly limits their applicability. The increased cost of manufacturing and process control of such fibres also leads to a significantly higher fibre price compared to standard fibres.

It is also known that special metallic coatings have hermetic properties against the penetration of hydrogen or moisture. Metallic coatings, such as those made e.g. of aluminum, copper or gold, can be produced with layer thicknesses of approx. 15 to 25 µm (see https://www.researchgate.net/publication/253791167). However, metal coating application is technologically complex and generally can only be realized without interference for short fibre lengths. Therefore, longer fibre lengths of metal-coated fibres are not commercially available.

The metal-coated fibres exhibit high microcurvature losses due to the high E modulus of the metal and the high coefficient of thermal expansion of the metallic coating material compared to quartz glass (see https://www.researchgate.net/publication/253791167). To reduce the microcurvature losses, larger fibre diameters of 200 µm or larger compared to the standard fibre diameter of 125 µm are proposed. However, when the fibre diameter is increased, increased macro-curvature losses occur with macroscopic fibre curvatures.

In addition, metallic coatings can exhibit corrosion under adverse environmental conditions, which significantly limits the applicability of the fibres (see https://www.lightbrigade.com/productionFiles/Resource-PDF/Whitepapers/Hermetic-Fiber-for-Oil-and-Gas.aspx). Fibres with metallic coatings are therefore only used in short-distance connections and under non-corrosive ambient conditions.

EP 0095729 A2, for example, describes the manufacturing process of an optical fibre with hermetic coating during the fibre drawing process by thermochemical deposition with heterogeneous nucleation on the hot glass fibre surface. The glass fibre with hermetic coating can then preferably be provided with a further polymer layer to protect the hermetic layer from environmental influences.

All of the above hermetic coating types do not meet the requirements for fibre strength, hermeticity to hydrogen, and low optical attenuation (microcurvature or macro-curvature losses) simultaneously.

In WO2007/069275A2, a deuterium treatment of defined duration, with defined deuterium concentration, defined pressure and defined temperature is proposed to reduce hydrogen sensitivity and thus reduce hydrogen-induced losses in drawn fibres. The E' and NBOHC glass defects in the fibre react with deuterium to form Si-OD and SI-D compounds whose absorption ranges are outside the usual optical application wavelength ranges of 850 to 1550 nm. In order to perform this deuterium treatment professionally, a special autoclave is required to perform this treatment in reasonable times.

It is known from Pandey et al. ("Refractive index profile design to improve hydrogen diffusion resistance property of optical fiber", ICOP 2009, International Conference on Optics and Photonics, India, November 2009) that hydrogen diffusion in the fibre core is reduced by introducing specially doped hydrogen barrier layers in the outer cladding region. However, this solution is very costly because the barrier layers consist of GeO2-F and of P2O5-F doped layers in the outer cladding region and have to be fabricated, for example, by the MCVD coating method at high cost with the core region and the inner undoped cladding region. The distance between the doped barrier layers and the waveguiding core region is much smaller and narrower than in our proposed solution for cost reasons.

Quartz glass fibres with hydrogen insensitivity, low fibre attenuation and high fibre strength are widely used worldwide, preferably in optical communication systems and in fibre sensors.

As already stated above, the hydrogen sensitivity can be reduced by a carbon or a special metal layer. However, this property of hydrogen insensitivity is only made possible by a deteriorated fibre strength or significantly increased fibre attenuation values.

Thus, there was a need for hydrogen-insensitive quartz glass fibres with good mechanical and optical properties, and the quartz glass fibres should be relatively inexpensive to produce.

SUMMARY OF THE INVENTION

The invention relates to a quartz glass fibre (or "quartz fibre" or "glass fibre" for short), and a method of making the same. The quartz fibres have a hydrogen barrier layer, a high fibre strength and a low fibre attenuation.

Due to the special manufacturing conditions of the glass fibre during the fibre drawing process, E' and NBOHC (non-bridging oxygen hole center) defects are created in an outer undoped cladding layer of low in OH quartz glass, outside the waveguiding core area, which form a chemical compound with hydrogen diffusing into the fibres during later operation and thus serve as a hydrogen barrier. The special defects are created on the one hand by special fibre drawing conditions (e.g. increased furnace temperature compared to standard drawing conditions) and on the other hand by a targeted quasi-axial irradiation of intensive UV laser radiation (e.g. excimer laser) into the jacketing tube before the specially prepared preform is dipped into the drawing furnace (online jacketing during the fibre drawing process). The UV radiation during the drawing process should additionally generate both E' and NBOHC defects in the cladding area of the fibre.

While the prior art aims to achieve hydrogen insensitivity in the fibre core by avoiding defects (see, for example, Pandey et al., "Refractive index profile design to improve hydrogen diffusion resistance property of optical fiber" ICOP 2009, International Conference on Optics and Photonics, India, November 2009), the concept of the present invention is based on a completely different approach, namely, increasing the defect concentration in the cladding coating.

It is known from Hibino et al. ("ESR Study on E'-Centers Induced by Optical Fiber Drawing Process", Japanese Journal of Applied Physics, Volume 22, Part 2, No. 12) that the presence of OH suppresses the formation of oxygen vacancies. Since the present invention is based precisely on the formation of such defects, it is preferred to use a quartz glass material with low OH content.

It was also surprisingly found that the fluorine trench (fluorine doping) is needed to allow the defects to form only in the cladding layer. Without the refractive index trench, the UV radiation for defect generation below the drawing bulb would also be directed into the preform or fibre core and produce UV-induced undesired glass defects there.

By the method according to the invention, a large distance between the barrier layer and the waveguiding core region can be achieved. In particular, the quartz fibre according to the invention has the advantage of being insensitive to hydrogen diffusion during its use. This prevents additional attenuation generated by hydrogen diffusion.

In the case of the quartz fibre, a special technologically complex coating of carbon or of special metals can be dispensed with, which in the prior art ensure protection of the fibre against penetrating hydrogen. The quartz fibre becomes insensitive to hydrogen indiffusion due to hydrogen-absorbing defects in the outer undoped cladding region (which is formed from the jacketing tube) created during the fibre drawing process by special drawing conditions and/or by UV laser radiation. The negative effects of the carbon layer used in the prior art for this purpose on fibre strength are avoided, as are the negative effects of metallic protective layers on fibre attenuation, in particular due to microbending, in the solution to the problem according to the invention. The solution according to the invention is also considerably less expensive than the application of additional H2 barrier layers or the deposition of multiple doped barrier layers by means of MCVD processes between an inner and outer undoped cladding region.

In contrast to the known quartz glass fibres with hermetic coatings, the present invention makes it possible to produce hydrogen-insensitive fibres for long connections, whereby the fibres have suitable mechanical (e.g. fibre strength) and optical properties (i.e. low optical attenuation, in particular microcurvature or macro-curvature losses) and can be produced at low cost. Here, it is not necessary to use large fibre diameters. The fibre diameters (sheath diameters) can thus be less than 200 µm, in particular less than 150 µm (standard fibre diameters have 125 µm sheath diameters). In particular, the present invention does not require complex fabrication of multiple specially doped hydrogen barrier layers because the doped layers located outside the core can be realized via the MCVD coating process.

The invention thus relates to a method of manufacturing a quartz glass fibre, the method comprising the following steps:
 a) Producing a quartz glass primary preform by modified chemical vapor deposition (MCVD) in a quartz glass substrate tube;
 b) Inserting the quartz glass primary preform into a free glass jacketing tube,
 c) irradiating defect-generating UV radiation into the cross-sectional area of the glass jacketing tube while combining the quartz glass primary preform with the glass jacketing tube in the jacketing process to form a cladding layer to a secondary preform; and
 d) pulling a quartz glass fibre from the secondary preform.

The invention also relates to a quartz glass fibre made or producible by the method according to the invention. In particular, it relates to a quartz glass fibre comprising:
 a) a fibre core of quartz glass,
 b) a fluorine-doped radial layer on the fibre core,
 c) a cladding layer of quartz glass having an OH concentration of ≤0.2 ppm, a chlorine content of 800-2000 ppm and/or a refractive index of +0.35 to +0.5×10$^{-3}$ on the fibre core,
 wherein the quartz glass fibre is characterised in that
 d) the cladding layer has E' and NBOHC defects.

DETAILED DESCRIPTION OF THE INVENTION

The idea of the present invention is to selectively create E' and NBOHC glass defects in the cladding region of a quartz glass fibre during the fibre drawing process, which later react with molecular hydrogen entering the fibre and thus create a hydrogen diffusion barrier. Both E' and NBOH (non-bridging-oxygen-hole center) defects are known to react with hydrogen according to FIG. 2. The presence of hydrogen in the quartz glass during defect generation can prevent defect formation, or the defects will then react directly with the hydrogen (Troy et al., "Role of hydrogen loading and glass composition on the defects generated by the femtosecond laser writing process of fiber Bragg gratings" in *Optical Materials Express* 2 (11): 1663-1670, November 2012).

Hydrogen molecules thus produce Si—OH and Si—H compounds when reacting with E' and NBOHC defects, which, however, do not lead to increased transmission losses in the waveguiding core region of the fibre outside the waveguiding region (outer cladding region).

The two selected glass defects E' and NBOHC are preferably generated by special process conditions during fibre drawing (e.g. increased drawing temperature or furnace temperature) as well as by quasi-axial irradiation of defect-generating UV laser radiation (continuous or pulsed excimer laser radiation) into the cross-sectional area of the cladding glass (free jacketing during online jacketing during the fibre drawing process) of the preform entering the drawing furnace.

This allows the fibre to protect the waveguiding glass region in the fibre center from hydrogen under the subsequent conditions of use, depending on the number of hydrogen-bonding defects created, and to prevent the additional attenuations that are undesirable as a result.

Usually, the process conditions in the manufacture of optical fibres are selected in such a way that as few drawing-induced defects as possible are produced. However, as long as these defects are not located in the waveguiding fibre region (fibre core, e.g. in multimode fibres) and have absorption bands in the working wavelength range, the two point defects considered here in particular are not critical.

The possible sources of hydrogen are either the surrounding atmosphere of the fibre under the specific subsequent conditions of use of the fibre, or the hydrogen is emitted from the surrounding cable material in which the fibre is incorporated.

Due to the interstitial hydrogen, undesirable additional attenuations are generated in the waveguiding core region, especially at 1240 and 1590 nm. The reaction of hydrogen with certain glass defects in the waveguiding region can, for example, produce Si—OH bonds which absorb light at a wavelength of 1383 nm.

Since the typical construction of fibres for the communications sector consists of a generally doped waveguiding fibre core and a generally undoped fibre cladding, and the hydrogen action occurs from the outside of the fibre inward, the glass defects in the undoped quartz glass, outside the waveguiding region are considered, which shall bind the hydrogen.

Newer fibre designs particularly those with reduced macro-curvature sensitivity (both single-mode and multi-mode fibres) additionally have a fluorine-doped refractive index trench around the core. The fluorine trench is significant to the present invention because the fluorine-doped refractive index trench, the UV radiation used during the fibre drawing process to create the desired defect in the cladding region, is required for waveguiding in the cladding after the fusion of the jacketing tube to the core preform. Without the refractive index trench, the UV radiation used to create defects below the drawing bulb would also be directed into the preform or fibre core, where it would create UV-induced undesirable glass defects.

A typical manufacturing process of a modern bend insensitive fibre includes, for example, MCVD deposition in an F-300 substrate tube (see https://www.heraeus.com/media/media/hqs/doc_hqs/products_and_solutions_8/optical_fiber/Fiber_Tubes_EN_2018_04.pdf) and collapsing of the internally coated tube into a solid rod. After the preform fabrication another thermal treatment in a hydrogen-free plasma flame for several hours is carries out to deposit a fluorine trench at temperatures of above 2100° C. The subsequent jacketing process is typically performed on-line in a fibre drawing furnace of graphite material in an argon/helium atmosphere using, for example, F-300 jacketing tube material. The F-300 tube material is used in tube-based preform fabrication processes such as MCVD or PCVD processes (plasma activated chemical vapor deposition) as both substrate and jacketing tube material, and typically has a Cl content of 800 to 2000 ppm and/or an OH content of 0.2 ppm (see https://www.heraeus.com/media/media/hqs/doc_hqs/products_and_solutions_8/optical_fiber/Fiber_Tubes_EN_2018_04.pdf). FIG. 1 provides an overview of the defects that occur in quartz glass.

The reaction products of the E' and NBOHC defects with hydrogen, i.e. Si—H and Si—OH bonds) can lead to additional optical absorptions, but because the defects are localized in the cladding region, the waveguiding in the inner core region is not disturbed by these defects. The hydrogen bound to the outer defects cannot now diffuse into the fibre core region and form disturbing absorptions there by reacting with other defects that may be present.

The concentration of E' and NBOHC defects depends on the cladding material (manufacturing process, impurity level), on the stoichiometry and on the temperature conditions during further processing and on the special laser treatment during the cooling process of fibre drawing. Process conditions are selected that avoid the generation of defects other than E' and NBOHC defects as far as possible and reduce the influence of hydrogen, for example, by a chlorine-containing atmosphere during glass production to a minimum.

E' centers are preferably present in larger concentrations in oxygen deficient quartz glass (oxygen deficient silica), whereas NBOHC defects are preferably present in oxygen excess $SiO_2$ (oxygen excess silica) (see https://neup.inl.gov/SiteAssets/Final%20%20Reports/09-819%20NEUP%20Final%20Report.pdf, page 21 bottom).

TABLE 1 optical parameters of the two defects for the formation of the H2 diffusion barrier:

| Defect type | Absorption peak (eV) | Absorption peak (nm) | FWHM (the full width at half maximum) eV |
| --- | --- | --- | --- |
| E' | 5.8 | 214 | 0.7 |
| NBOHC | 2.0 | 620 | |
| NBOHC | 4.8 | 258 | 1.05 |
| NBOHC | 6.4-6.8 | 194-182 | |

The formation energy of E' defects is 3.8 eV (326 nm) and can be specifically generated by laser radiation (e.g. He-CD laser 325 nm). The E' defect concentration can also be selectively increased during fibre drawing. The higher the drawing furnace temperature, the greater the E' defect concentration increase (see Hibino et al., "ESR Study on E'-Centers Induced by Optical Fiber Drawing Process," Japanese Journal of Applied Physics, Volume 22, Part 2, No. 12). The concentration of E' defects and NBOHC defects can be determined as described by Yang (Jing Yang, "Numerical modeling of hollow optical fiber drawing", PhD thesis 2008, Rutgers State University of New Jersey).

To calculate the penetration depth of the laser radiation into the cladding glass, the Lambert-Beer absorption law according to (https://sundoc.bibliothek.unihalle.de/diss-online/04/04H209/t3.pdf, page 19) is used.

$$\frac{I}{I_0} = e^{-\alpha d}$$

The penetration depth of the laser radiation is defined as the layer thickness d, after which the intensity I has dropped to 10% of its original value $I_0$.

TABLE 2 calculated penetration depth of the laser radiation into the cladding glass F300 (manufacturer Heraeus Quarzglas) at different laser wavelengths:

| Wavelength in nm | Photon energy in eV | Absorption coefficient in cm^−1 | Penetration depth in quartz glass in cm | reference |
|---|---|---|---|---|
| 155 | 8.0 | 50 (F300) | 0.05 | * Page 5/ |
| 165 | 7.5 | 7 (F300) | 0.23 | * Page 5/ |
| 191 | 6.5 | 2 (F300) | 1.2 | * Page 5/ |
| 250 | 5.0 | ~0.5 | 4.6 | ** |
| 325 | 3.8 | | | |
| 1000 | 1.24 | 10 * 10^−6 | 2303000 | *** |

\* https://www.researchgate.net/profile/Giovanna_Navarra/publication/4155763_Absorption_edge_in_silica_glass/links/02e7e525fade3f17f2000000/Absorption-edge-in-silica-glass.pdf?origin=publication_detail
\*\* https://ntrs.nasa.gov/archive/nasa/casi.ntrs.nasa.gov/19660007266.pdf
\*\*\* https://www.crystran.co.uk/optical-materials/silica-glass-sio2

After optimizing the fibre drawing process to obtain the generation of a high concentration of E' and NBOHC defects in the F300 cladding glass, the additional generation of the two defects is simultaneously performed by a special UV laser irradiation. It is known from Skuja et al. (L. Skuja et al. "Laser-induced color enters in silica" Proc. SPIE vol. 4347, p. 1/14-14/14) that laser excitation has an anisotropic character and therefore the spatial distribution of the induced defects is not random. Therefore, in order to create defects uniformly over the entire outer circumference of the cladding region of the fibre, it is necessary that the angle of incidence into the cladding region be at an angle to the direction of the fibre axis α.

Figure 4:
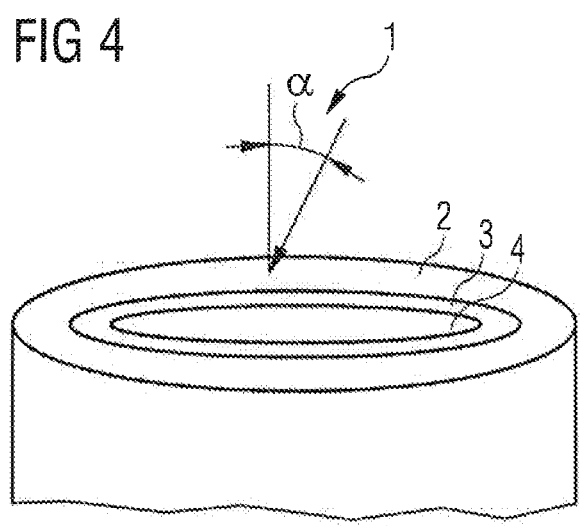

In addition, in order to achieve uniform defect generation over the circumference, the UV laser radiation should be coupled into the cross-sectional area of the outer jacketing tube above the drawing furnace as shown in FIG. 4.

The angle of incidence α of the UV laser radiation into the cross-sectional area of the outer jacketing tube must be selected so that the numerical aperture (NA) of the waveguide formed by the jacketing tube with the air gap on the outside and inside until fusion with the fluorine trench of the primary preform in the hot furnace zone is not exceeded. The reduction in refractive index of the fluorine trench relative to the undoped cladding glass is typically in the range of ca. −5 to ca. −10*10^−3 (NA btw. 0.12 and 0.17, angle of incidence btw. α≤5° and ≤7°). Before the fusion of the jacketing tube with the core preform, waveguiding occurs in the jacketing tube glass, which is surrounded by air on the inside and outside and therefore has a significantly larger NA.

In the hot zone of the drawing furnace, the fusion of the inner side of the jacketing tube with the outer side of the fluorine trench of the core preform occurs. From this position, the NA of the outer cladding waveguide drops to the NA of the fluorine trench. This outer cladding waveguide is effective below the drawing bulb within the drawing furnace. By applying the typically used two-layer acrylate with a refractive index significantly higher than the refractive index of the cladding material, the outside of the outer cladding waveguide loses its waveguiding character and the remaining UV radiation enters the coating material where it is coupled out and absorbed. This means that only when the high index standard acrylate coating is applied to the outer fibre surface can the coupled UV laser radiation leave the fibre. Whether the UV radiation coupled above the drawing furnace reaches the polymer coating site depends on the wavelength of the UV radiation used and the absorption coefficient of the cladding glass (jacketing tube material) used.

By combining particularly suitable fibre drawing conditions with the additional generation of E' and NBOHC defects by UV laser radiation of suitable wavelength and intensity coupled into the fibre at an angle of incidence α above the drawing furnace, sufficiently high concentrations of the desired defects are formed in the outer cladding material below the drawing furnace to create a hydrogen diffusion barrier in the fabricated fibre.

The invention thus relates to the following embodiments:

1. A method of manufacturing a quartz glass fibre, said method comprising the steps of:
   a) producing a quartz glass primary preform by modified chemical vapor deposition (MCVD) in a quartz glass substrate tube;
   b) inserting the quartz glass primary preform into a free glass jacketing tube,
   c) irradiating defect-generating UV radiation into the cross-sectional area of the glass jacketing tube while combining the quartz glass primary preform with the glass jacketing tube in the jacketing process to form a cladding layer to a secondary preform; and
   d) pulling a quartz glass fibre from the secondary preform.

2. The method of embodiment 1, wherein the defect-generating UV radiation generates E' and NBOHC defects in the cladding layer.

3. The method according to embodiment 1 or 2, wherein the defect-generating UV radiation is irradiated, preferably axially, into the free glass jacketing tube.

4. The method of any one of embodiments 1-3, wherein the free glass jacketing tube comprises quartz glass having an OH concentration of ≤0.2 ppm, a chlorine content of 800-2000 ppm, and/or a refractive index of +0.35 to +0.5× 10^−3.

5. The method according to any one of embodiments 1-4, wherein the quartz glass primary preform comprises a fluorine-doped radial layer on the fibre core.

6. The method according to any one of embodiments 1-5, wherein the E' and NBOHC defects are located in the outer radial region of the cladding layer.

7. The method according to any one of embodiments 1-6, wherein the quartz glass fibre is a multimode fibre.

8. The method according to any one of embodiments 5-7, wherein the refractive index drop from the fibre core to the fluorine-doped region in the primary preform is −5 to −10×10^−3.

9. The method according to any one of embodiments 1-8, wherein the method does not comprise a step of depositing a carbon or metal layer.

10. The method according to any one of embodiments 1-9, wherein the produced quartz glass fibre has no further doped layers.

11. The method according to any one of embodiments 1-10, wherein the method comprises a step of applying a polymer coating, in particular polyacrylate coating, on the produced quartz glass fibre.

12. The method according to any one of embodiments 1-11, wherein the method does not comprise a step of applying a silicon, boron nitride, C:H or Si:H coating.

13. The method according to any one of embodiments 1-12, wherein the method does not comprise a step of applying a barrier layer, for example a GeO2-F or P2O5-F doped layer.

14. The method of any one of embodiments 5-13, wherein the primary preform is treated with fluorine gas to produce a fluorine-doped radial layer on the primary preform.

15. Quartz glass fibre produced or producible by a process according to any one of embodiments 1-14.

16. Quartz glass fibre, comprising:
  a) a fibre core of quartz glass,
  b) a fluorine-doped radial layer on the fibre core,
  c) a cladding layer of quartz glass (preferably directly on the fluorine-doped radial layer), preferably of quartz glass having an OH concentration of ≤0.2 ppm, a chlorine content 800-2000 ppm and/or a refractive index of +0.35 to +0.5×10$^{-3}$ on the fibre core,
  wherein the quartz glass fibre is characterised in that
  d) the cladding layer has E' and NBOHC defects.

17. The quartz glass fibre of embodiment 16, wherein the cladding layer has a higher density of E' and NBOHC defects than the fibre core.

18. The quartz glass fibre according to embodiment 16 or 17, wherein the quartz glass fibre is a multimode fibre.

19. The quartz glass fibre according to any one of embodiments 16-18, wherein the refractive index drop from the fibre core to the fluorine-doped region is −5 to −10×10$^{-3}$.

20. The quartz glass fibre according to any one of embodiments 16-19, wherein the quartz glass fibre does not comprise a carbon or metal layer.

21. The quartz glass fibre according to any one of embodiments 16-20, wherein the quartz glass fibre has no further doped layers.

22. The quartz glass fibre according to any one of embodiments 16-21, wherein the quartz glass fibre has a polymer coating, in particular polyacrylate layer, over the cladding layer.

23. The quartz glass fibre according to any one of embodiments 16-22, wherein the quartz glass fibre does not have a hermetic coating.

24. The quartz glass fibre of any one of embodiments 16-23, wherein the quartz glass fibre does not have a silicon, boron nitride, C:H, or Si:H coating.

The invention thus relates to a method of manufacturing a quartz glass fibre, the method comprising at least steps (a)-(d). Preferably, the quartz glass fibre is a quartz glass optical fibre and in particular a multimode fibre.

In step (a), a quartz glass primary preform is formed by modified chemical vapor deposition (MCVD) in a quartz glass substrate tube.

The substrate tube for producing the primary preform is preferably an F-300 glass tube, for example a quartz glass with an OH concentration of ≤0.2 ppm, a chlorine content of 800-2000 ppm and/or a refractive index of +0.35 to +0.5×10$^{-3}$.

The step of producing a quartz glass primary preform by modified chemical vapor deposition (MCVD) in a quartz glass tube includes collapsing the quartz glass tube after vapor deposition. Processes for producing preforms are known to those skilled in the art. Such processes are described, for example, in the following documents: DE69922728 T2, U.S. Pat. Nos. 4,276,243A, 4,412,853, and 4,582,480.

The quartz glass primary preform preferably has a fluorine-doped radial layer on the fibre core. The primary preform may be treated with fluorine gas to produce this fluorine-doped radial layer on the primary preform. The refractive index drop from the fibre core to the fluorine-doped region in the primary preform is preferably −5 to −10×10$^{-3}$.

In step (b), the quartz glass primary preform is placed in a (free) glass jacketing tube (see FIG. 4). A normal jacketing process can be used here, with the difference that according to the invention the free jacketing tube is irradiated with UV radiation. The glass jacketing tube is preferably made of quartz glass.

In step (c), defect-generating UV radiation is irradiated into the cross-sectional area of the glass jacketing tube, while the quartz glass primary preform is combined with the glass jacketing tube in the jacketing process to form a cladding layer to a secondary preform. The (outer) cladding layer is thus based on the jacketing tube used.

The defect-generating UV radiation creates E' and NBOHC defects in the cladding layer. For example, an excimer laser (in particular a 325 nm He-CD laser) can be used as the radiation source.

Definition of NBOHC defect: The center of a NBOHC defect is an oxygen atom with only one bond to a silicon atom and one unbound electron, i.e. dangling bond (≡S—O·), which can be detected e.g. by an absorption band at 260 nm and 630 nm and its characteristic fluorescence at 650 nm (see also L. Skuja et al., "Laser-induced color enters in silica", Proc. SPIE vol. 4347, p. 1/14-14/14).

The center of an E' defect is a triply coordinated silicon atom with or without a paramagnetic electron (≡Si·), and the E' defect is detectable, for example, from an absorption band at 210 nm by ESR or EPR (see Hibino et al., "ESR Study on E'-Centers Induced by Optical Fiber Drawing Process," Japanese Journal of Applied Physics, Volume 22, Part 2, No. 12; and L. Skuja et al., "Laser-induced color enters in silica," Proc. SPIE vol. 4347, p. 1/14-14/14).

Si—OH bonds absorb waves with a wavelength of 1383 nm.

The defect-generating UV radiation is irradiated quasi-axially into the free glass jacketing tube. The quasi-axial irradiation of the UV radiation occurs in that the angle of irradiation into the cladding region is at an angle to the direction of the fibre axis α. The irradiation angle α of the UV laser radiation into the cross-sectional area of the outer jacketing tube is selected such that the numerical aperture of the waveguide formed by the jacketing tube with the air gap on the outside and inside until it fuses with the fluorine trench of the primary preform in the hot furnace zone is not exceeded. The angle of incidence α of the UV laser radiation is, for example, greater than 0° and less than 10°, for example greater than 0° and less than 5°, or greater than 1° and less than 7°.

In one embodiment of the invention, the furnace temperature during the fibre drawing process from the secondary preform is higher than the furnace temperature in conventional processes, for example, the process is carried out at a furnace temperature greater than 2280K, or greater than 2320, or greater than 2350 K.

Moreover, an increased drawing speed of more than 25 m/min, or more than 40 m/min, or more than 50 m/min can be applied.

The step of forming a quartz glass secondary preform includes collapsing the jacketing tube onto the primary preform. The free glass jacketing tube consists for example of quartz glass having an OH concentration of ≤0.2 ppm, a chlorine content of 800-2000 ppm, and/or a refractive index of +0.35 to +0.5×10$^{-3}$. A quartz glass with a low OH ion content can be produced, for example, by the interior of the preform containing vaporous and/or gaseous chlorine before and/or during the production of the glass fibre, but at least during the drawing process.

In step (d), a quartz glass fibre is drawn from the secondary preform.

In the process according to the invention, the secondary preform is not pretreated with hydrogen (i.e. not loaded with hydrogen), otherwise defect formation is prevented.

In an optional step (e), a polymer coating, in particular a polyacrylate coating, is applied to the generated quartz glass fibre.

Preferably, the method does not comprise a step of applying a hermetic coating, for example carbon or metal layer, silicon, boron nitride, C:H or Si:H coating and/or applying a barrier layer, for example a GeO2-F or P2O5-F doped layer.

The produced quartz glass fibre also has, for example, no other doped layers.

The invention also relates to a quartz glass fibre produced or producible by the process according to the invention. The quartz glass fibre is characterized by the structural properties generated by the process according to the invention, i.e. the cladding layer has E' and NBOHC defects. The above embodiments relating to the process according to the invention thus equally relate to the quartz glass fibre that can be produced according to the invention.

The invention therefore also relates to a quartz glass fibre, comprising:
a) a fibre core of quartz glass,
b) a fluorine-doped radial layer on the fibre core,
c) a cladding layer of quartz glass having an OH concentration of ≤0.2 ppm, a chlorine content of 800-2000 ppm and/or a refractive index of +0.35 to +0.5×10$^{-3}$ on the fibre core,
wherein the quartz glass fibre is characterised in that
d) the cladding layer has E' and NBOHC defects.

The quartz glass fibre according to the invention is preferably produced by the method according to the invention. All of the above embodiments relating to the process according to the invention thus equally relate to the quartz glass fibre according to the invention.

The cladding layer has a higher density of E' and NBOHC defects than the fibre core and the quartz glass substrate tube, respectively, which has been used to form the primary preform. In one embodiment, the same quartz glass is used as the quartz glass substrate tube for making the primary preform and the free jacketing tube. This results in two radial regions of quartz glass fibre from this quartz glass, with the outer region (based on the jacketing tube) having a higher density of E' and NBOHC defects than the inner region.

The quartz glass fibre is preferably a multimode fibre. In contrast to the known quartz glass fibres, the hydrogen insensitivity is not achieved by a hermetic coating, in particular not by a carbon, metal, silicon, boron nitride, C:H or Si:H coating. The production of hermetic coatings with carbon or boron nitride is known (see http://www.dtic.mil/dtic/tr/fulltext/u2/a189886.pdf, or https://www.osti.gov/servlets/purl/14067).

The refractive index drop from the fibre core to the fluorine-doped region is preferably −5 to −10×10$^{-3}$. No other doped layers are present, especially not in the cladding layer.

Preferably, a polymer coating is applied to the quartz glass cladding layer, in particular a polyacrylate layer.

After the defects in the quartz glass cladding layer have reacted with hydrogen over the operating lifetime, a quartz fibre with Si—OH and Si—H compounds has formed, providing a protective barrier against further hydrogen.

The invention therefore also relates to a quartz glass fibre, comprising:
a) a fibre core of quartz glass,
b) a fluorine-doped radial (quartz glass) layer on the fibre core,
c) a cladding layer of quartz glass having an OH concentration of ≤0.2 ppm, a chlorine content of 800-2000 ppm and/or a refractive index of +0.35 to +0.5×10$^{-3}$ on the fibre core,
wherein the quartz glass fibre is characterised in that
d) the cladding layer comprises Si—OH and/or Si—H compounds.

The cladding layer has a higher density of Si—OH and Si—H compounds than the fibre core and the quartz glass substrate tube, respectively, which has been used to form the primary preform. In one embodiment, the same quartz glass is used as the quartz glass substrate tube for making the primary preform and the free jacketing tube. This results in two radial regions of quartz glass fibre from this quartz glass, with the outer region (cladding layer) having a higher density of Si—OH and Si—H compounds than the inner region. This can be investigated spectroscopically. Si—OH bonds absorb waves with a wavelength of 1383 nm. Preferably, the cladding layer is made of F300 quartz glass, wherein the concentration of Si—OH in the produced cladding layer after reaction with hydrogen is more than 5 ppm and the concentration of Si—OH in the fibre core is less than 5 ppm. These embodiments may also be combined with the foregoing embodiments.

FIGURES

The present disclosure will be further explained with reference to figures:

FIG. 1: Optical absorption bands of the known defects in quartz glass (see L. Skuja et al., "Laser-induced color enters in silica" Proc. SPIE vol. 4347, p. 1/14-14/14). Numbering: 1: fluoride groups ≡Si—F; 2: hydride groups ≡Si—H; 3: chloride groups ≡Si—Cl; 4: oxygen vacancies (SiODC(I)); 5: hydroxyl groups ≡Si—O—H; 6: peroxy bridge Si—O—O—Si; 7: E* centers: ≡Si·Si≡ or ≡Si·; 8: peroxy radicals ≡Si—O—O·; 9: SiODC (II) (divalent Si/O vacancy); 10: ozone O3; 11: interstitial Cl$_2$; 12: non-bridging oxygen ≡Si—O; 13: interstitial oxygen O$_2$; 14: self-trapped holes.

Figure 2:
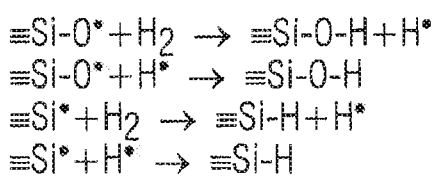

FIG. 2: FIG. 2: the reactions of E' and NBOHC defects in quartz glass with hydrogen (see https://neup.inl.gov/SiteAssets/Final%20%20Reports/09-819%20NEUP%20Final%20Report.pdf, page 28).

Figure 3:
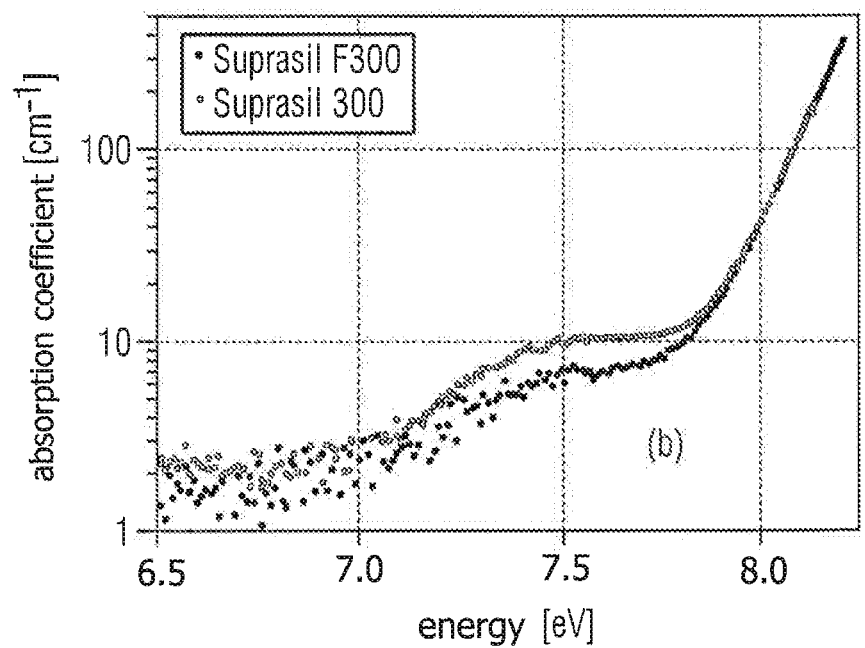

FIG. 3: Measured absorption of Suprasil F300 quartz glass and Suprasil 300 at 300 K as a function of radiant energy according to (see https://www.researchgate.net/profile/Giovanna_Navarra/publication/4155763_Absorption_edge_in_silica_glass/links/02e7e525fade3f17f2000000/Absorption-edge-in-silica-glass.pdf?origin=publication_detail).

FIG. 4: Schematic representation of the preform to be drawn before entering the drawing furnace with schematic representation of the coupling of the UV laser radiation. Reference signs: 1: UV laser radiation; 2: jacketing tube e.g. made of F300 quartz glass; 3: air gap between jacketing tube and primary preform; 4: primary preform with outer fluorine trench. FIG. 4 shows the primary preform inserted into the free jacketing tube. The angle of incidence is selected as described above.

FIG. 5: Schematic structure of the fibre drawing device for the production of hydrogen-insensitive fibres with high fibre strength and low fibre attenuation. Reference signs: 1: preform feed; 2: secondary preform consisting of jacketing tube and core preform for on-line jacketing; 3: drawing bulb in the hot furnace zone; 4: drawing furnace with immersed secondary preform; 5: coating unit; 6: drawing speed of the fibre; 7: glass fibre after leaving the drawing furnace; 8: quasi-axial UV laser irradiation into the cross-section of the jacketing tube.

CITED PUBLICATIONS https://www.researchgate.net/profile/Giovanna_Navarra/publication/4155763_Absorption_edge_in_silica_glass/links/02e7e525fade3f17f2000000/Absorption-edge-in-silica-glass.pdf?origin=publication_detail:
https://www.lightbrigade.com/productionFiles/Resource-PDF/Whitepapers/Hermetic-Fiber-for-Oil-and-Gas.aspx
http://www.dtic.mil/dtic/tr/fulltext/u2/a189886.pdf
https://www.osti.gov/servlets/purl/14067
https://sundoc.bibliothek. uni-halle.de/dissonline/04/04H209/t3.pdf
https://ntrs.nasa.gov/archive/nasa/casi.ntrs.nasa.gov/19660007266.pdf
https://www.crystran.co.uk/optical-materials/silica-glass-sio2
Joshua M. Jacobs, "The impact of hydrogen on optical fibers", Corning White Paper, WP 97-9-2004 (https://www.corning.com/media/worldwide/global/documents/sfiber%20WP9007_Hydrogen%20Aging.pdf)
https://neup.inl.gov/SiteAssets/Final%20%20Reports/09-819%20NEUP%20Final%20Report.pdf
https://www.heraeus.com/media/media/hqs/doc_hqs/products_and_solutions_8/optical_fiber/Fiber_Tubes_EN_2018_04.pdf
Hibino et al., "ESR Study on E'-Centers Induced by Optical Fiber Drawing Process", Japanese Journal of Applied Physics, Volume 22, Part 2, Nr. 12
https://www.laserfocusworld, com/articles/print/volume-51/issue-04/features/fiber-optic-components-harsh-environment-optical-fiber-coatings-beauty-is-only-skin-deep.html
https://www.researchgate.net/publication/253791167
Jing Yang, "Numerical modeling of hollow optical fiber drawing", Dissertation 2008, Rutgers State University of New Jersey
EP 95729 A2
L. Skuja et al., "Laser-induced color enters in silica", Proc. SPIE vol. 4347, p. 1/14-14/14
A. K. Pandey et al., "Refractive index profile design to improve hydrogen diffusion resistance property of optical fiber", ICOP 2009, International Conference on Optics and Photonics, India, November 2009
Troy et al., "Role of hydrogen loading and glass composition on the defects generated by the femtosecond laser writing process of fiber Bragg gratings" in Optical Materials Express 2(11):1663-1670-11-2012
DE69922728 T2,
U.S. Pat. No. 4,276,243A,
U.S. Pat. No. 4,412,853, und
U.S. Pat. No. 4,582,480

The invention claimed is:

1. A method of manufacturing a quartz glass fibre, said method comprising the steps of:
a) producing a quartz glass primary preform by modified chemical vapor deposition (MCVD) in a quartz glass substrate tube;
b) inserting the quartz glass primary preform with a fluorine-doped radial layer on the fibre core into a glass jacketing tube containing chlorine,
c) irradiating defect-generating ultra-violet (UV) radiation into the cross-sectional area of the glass jacketing tube while combining the quartz glass primary preform with the glass jacketing tube in the jacketing process to form a cladding layer on the fibre core to a secondary preform, wherein the cladding layer defines a hydrogen barrier around the fibre core in response to irradiation of the glass jacketing; and
d) pulling a quartz glass fibre from the secondary preform.

2. The method of claim 1, wherein the defect-generating UV radiation generates E' defects and non-bridging oxygen hole center (NBOHC) defects in the cladding layer of the quartz fibre.

3. The method of claim 1, wherein the defect-generating UV radiation is irradiated into the glass jacketing tube.

4. The method of claim 1, wherein the glass jacketing tube consists of quartz glass having a hydroxl (OH) concentration of $\leq 0.2$ ppm, the chlorine having a content of 800-2000 ppm, and/or a refractive index of +0.35 to $+0.5 \times 10^{-3}$.

5. The method of claim 1, wherein the defect-generating UV radiation is irradiated into the cross-sectional area of the glass jacketing tube while the quartz glass fibre is pulled from the secondary preform.

6. The method of claim 1, wherein the defect-generating UV radiation is irradiated into a longitudinal cross-section of the glass jacketing tube.

7. The method of claim 1, wherein the fluorine-doped radial layer is provided on the fibre core after producing the quartz glass primary preform by MCVD.

8. A method of manufacturing a quartz glass fibre, said method comprising the steps of:
a) producing a quartz glass primary preform by modified chemical vapor deposition (MCVD) in a quartz glass substrate tube;
b) inserting the quartz glass primary preform with a fluorine-doped radial layer on the fibre core into a glass jacketing tube containing chlorine,
c) irradiating defect-generating ultra-violet (UV) radiation into the cross-sectional area of the glass jacketing tube while combining the quartz glass primary preform with the glass jacketing tube in the jacketing process to form a cladding layer on the fibre core to a secondary preform, wherein the glass jacketing tube includes an axial end surface upstream of where the quartz glass primary preform is combined with the glass jacketing tube and the defect-generating UV radiation is irradiated into the axial end surface; and
d) pulling a quartz glass fibre from the secondary preform.

9. A method of manufacturing a quartz glass fibre, said method comprising the steps of:
a) producing a quartz glass primary preform by modified chemical vapor deposition (MCVD) in a quartz glass substrate tube;
b) inserting the quartz glass primary preform with a fluorine-doped radial layer on the fibre core into a glass jacketing tube containing chlorine,
c) irradiating defect-generating ultra-violet (UV) radiation into the cross-sectional area of the glass jacketing tube while combining the quartz glass primary preform with the glass jacketing tube in the jacketing process to form a cladding layer on the fibre core to a secondary preform, wherein only the glass jacketing tube is irradiated with defect-generating radiation; and d) pulling a quartz glass fibre from the secondary preform.

\* \* \* \* \*